United States Patent
Craig et al.

(10) Patent No.: US 10,172,284 B2
(45) Date of Patent: Jan. 8, 2019

(54) SUGARCANE COMPRESSION THROWER

(71) Applicant: DEERE & COMPANY, Moline, IL (US)

(72) Inventors: Paul I. Craig, Thibodaux, LA (US); Mark S. Louviere, Houma, LA (US); John P. Scrivner, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 368 days.

(21) Appl. No.: 14/921,338

(22) Filed: Oct. 23, 2015

(65) Prior Publication Data

US 2017/0112058 A1   Apr. 27, 2017

(51) Int. Cl.
*A01D 41/127* (2006.01)
*A01D 41/12* (2006.01)
*A01D 45/10* (2006.01)
*A01D 61/02* (2006.01)

(52) U.S. Cl.
CPC ....... *A01D 41/1208* (2013.01); *A01D 41/127* (2013.01); *A01D 45/10* (2013.01); *A01D 61/02* (2013.01)

(58) Field of Classification Search
CPC ............ A01D 41/1208; A01D 41/1217; A01D 45/10; A01D 61/02
USPC ..................................................... 56/10.2 G
See application file for complete search history.

(56) References Cited

U.S. PATENT DOCUMENTS

| | | | | |
|---|---|---|---|---|
| 1,459,247 A | * | 6/1923 | Vilar Y Pazos | A01D 45/10 56/13.9 |
| 1,726,043 A | | 8/1929 | Scranton | |
| 3,325,982 A | * | 6/1967 | Fogels | A01D 45/10 56/11.2 |
| 3,456,429 A | * | 7/1969 | Sexton, Jr. | A01D 45/10 56/13.7 |
| 3,460,324 A | * | 8/1969 | Tolar | A01D 45/10 56/10.7 |
| 3,690,358 A | * | 9/1972 | Tilby | C13B 5/00 241/60 |
| 3,863,431 A | * | 2/1975 | Fowler | A01D 45/10 56/11.9 |
| 4,177,953 A | | 12/1979 | Ribeiro Pinto | |
| 4,295,325 A | | 10/1981 | Cannavan | |
| 4,550,552 A | | 11/1985 | Stiff | |
| 5,031,392 A | * | 7/1991 | Baker | A01D 45/10 460/123 |
| 5,235,798 A | * | 8/1993 | Giardina | A01D 90/02 56/16.6 |
| 5,452,652 A | * | 9/1995 | Brooks | A01G 13/0287 100/100 |
| 6,363,700 B1 | * | 4/2002 | Fowler | A01D 45/10 56/13.3 |

(Continued)

FOREIGN PATENT DOCUMENTS

AU             632145 B2    12/1992

*Primary Examiner* — Thomas B Will
*Assistant Examiner* — Mai T Nguyen

(57) ABSTRACT

A compression thrower for a sugarcane harvester having a receptacle for receiving sugarcane. The compression thrower includes a first belt configured to receive sugarcane from the receptacle. A compression device is configured to compress sugarcane into a mat of sugarcane against a second belt adjacent the compression device. The second belt is configured to propel the mat of sugarcane from the sugarcane harvester to a target location.

18 Claims, 3 Drawing Sheets

(56) References Cited

U.S. PATENT DOCUMENTS

| | | | |
|---|---|---|---|
| 7,837,542 B1* | 11/2010 | Ricketts | A01D 43/07 460/99 |
| 7,966,796 B2 | 6/2011 | Leach et al. | |
| 8,240,115 B2* | 8/2012 | Marchini | A01D 45/10 56/63 |
| 8,961,285 B2* | 2/2015 | Ricketts | A01D 90/02 460/114 |
| 2007/0163606 A1 | 7/2007 | Chojnacki et al. | |
| 2009/0165433 A1 | 7/2009 | Jauncey et al. | |
| 2015/0173298 A1 | 6/2015 | Jager | |

\* cited by examiner

SUGARCANE COMPRESSION THROWER

FIELD OF THE DISCLOSURE

The present disclosure generally relates to harvesters, and more particularly to a compression thrower for a sugarcane harvester.

BACKGROUND OF THE DISCLOSURE

In order to transport crops from a harvester to a wagon, an elevator is commonly used that pulls a slat along a fixed floor to move the crop.

SUMMARY OF THE DISCLOSURE

In one embodiment, a sugarcane harvester is disclosed. The sugarcane harvester comprises a basecutter configured to cut sugarcane. A feeding device is in communication with the basecutter to receive cut sugarcane. A chopping device is in communication with the feeding device. The chopping device is configured to chop the sugarcane received from the feeding device. A primary extractor is in communication with the chopping device and is configured to extract debris from the sugarcane. A receptacle is in communication with the primary extractor and is configured to receive sugarcane. A compression thrower is in communication with the receptacle. The compression thrower comprises a first belt configured to receive sugarcane from the receptacle. A compression device is configured to compress sugarcane into a mat of sugarcane against a second belt adjacent the compression device. The second belt is configured to propel the mat of sugarcane from the sugarcane harvester to a target location.

In another embodiment, a compression thrower for a sugarcane harvester having a receptacle for receiving sugarcane is disclosed. The compression thrower comprises a first belt configured to receive sugarcane from the receptacle. A compression device is configured to compress sugarcane into a mat of sugarcane against a second belt adjacent the compression device. The second belt is configured to propel the mat of sugarcane from the sugarcane harvester to a target location.

In yet another embodiment, a sugarcane harvester is disclosed. The sugarcane harvester comprises a basecutter configured to cut sugarcane. A feeding device is in communication with the basecutter to receive cut sugarcane. A chopping device is in communication with the feeding device. The chopping device is configured to chop the sugarcane received from the feeding device. A primary extractor is in communication with the chopping device and is configured to extract debris from the sugarcane. A receptacle is in communication with the primary extractor and is configured to receive sugarcane. A compression thrower is in communication with the receptacle. The compression thrower comprises a first belt configured to receive sugarcane from the receptacle. A compression device is configured to compress sugarcane into a mat of sugarcane against a second belt adjacent the compression device. The second belt is configured to propel the mat of sugarcane from the sugarcane harvester to a target location. A metering device adjacent the first belt is configured to control the flow of sugarcane. A deflector adjacent the second belt is configured to cooperate with the compression thrower to direct the mat of sugarcane to the target location.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
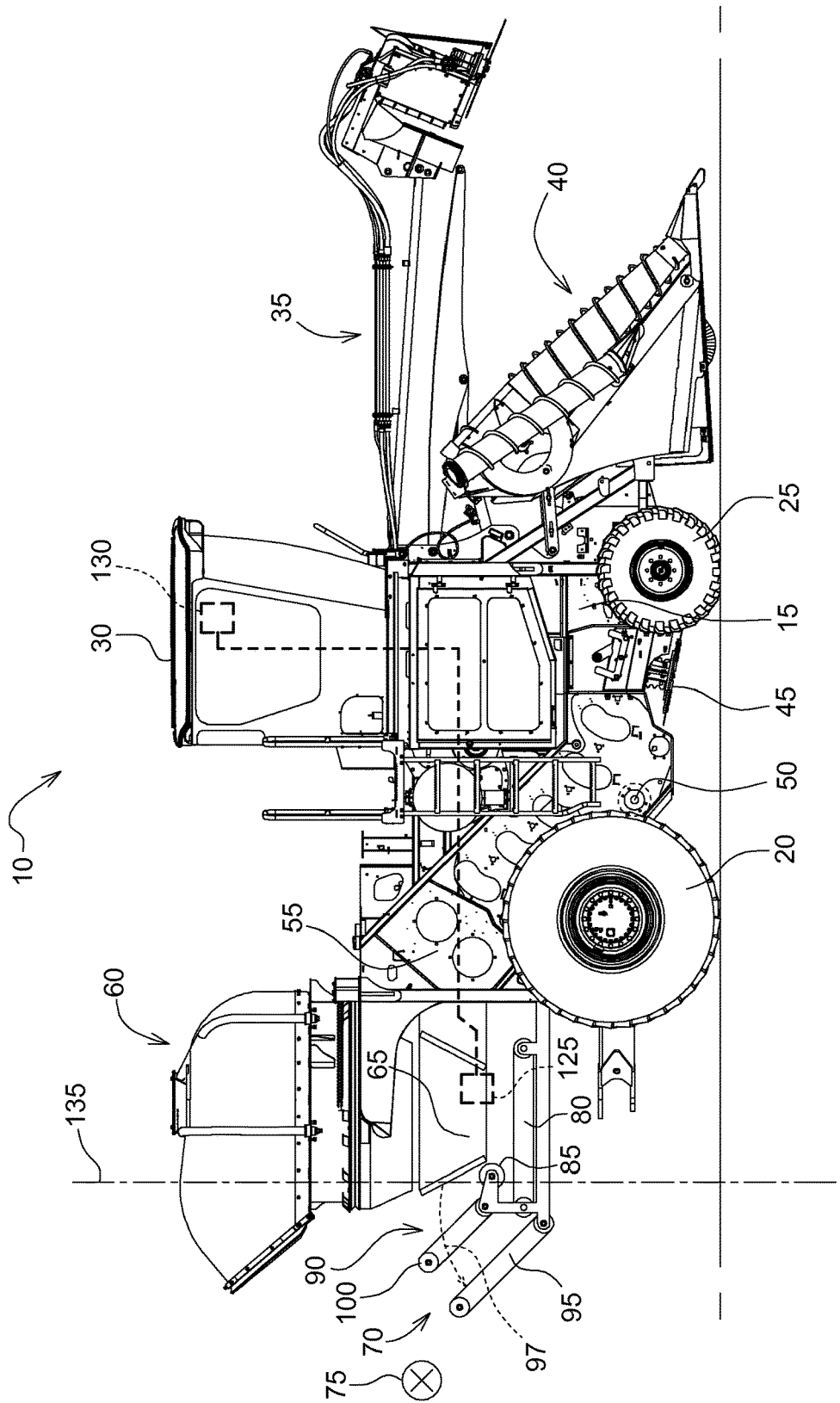
FIG. 1 is a side view of a sugarcane harvester according to one embodiment.
Figure 2:
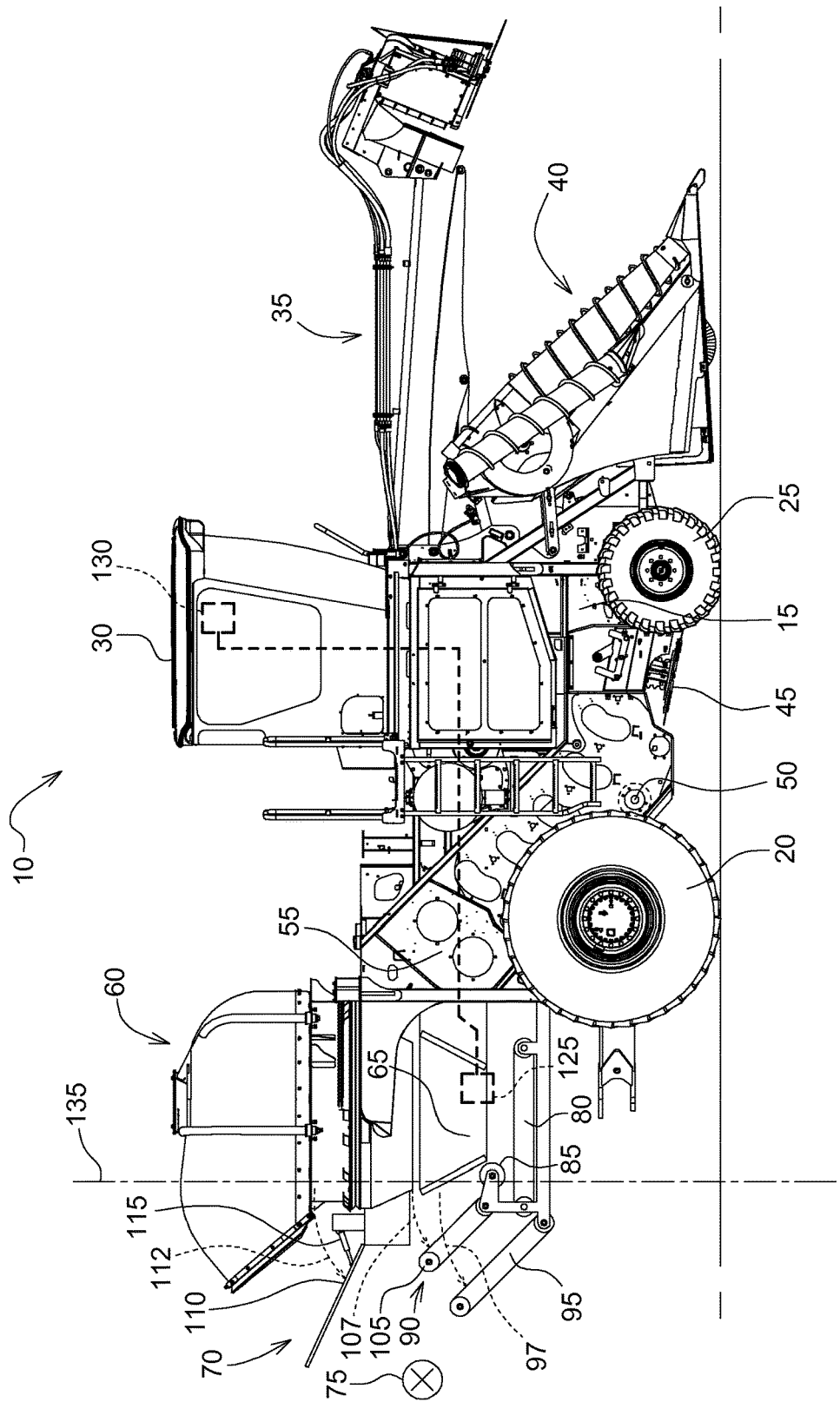
FIG. 2 is a side view of a sugarcane harvester according to another embodiment.

FIGS. 1 and 2 illustrate a harvester 10, depicted as a wheeled sugarcane harvester. The harvester 10 includes a frame 15 supported on a pair of rear drive wheels 20 and a pair of steerable front wheels 25, only one of which is shown. It is also contemplated that the front wheels 25 could also be powered or tracks (not shown) could be used to support the harvester 10. An operator station 30 is located at a central, forward location of the frame 15, and located behind the operator station 30 is an engine (not shown), which provides the power for driving the wheels 20 and other driven components of the harvester 10.

The operator station 30 gives a seated or standing operator a vantage point for viewing the operation of front-mounted equipment including a topper mechanism 35 mounted to the frame 15 between right- and left-hand crop divider assemblies 40, only one of which is shown. Located just behind and inwardly of the front wheels 25 of the harvester 10, so as to be at opposite sides of a longitudinal centerline of the harvester, are right- and left-hand basecutters 45, only one of which is shown, having cutting blades located so as to overlap at the middle of the harvester 10.

Thus, during operation, the crop divider assemblies 40 straddle a row of cane stalks which pass beneath the frame 15 and are severed from the ground by the basecutters 45. The basecutters 45 deliver the stalks to the rear to a feeding device 50 that transports the cane stalks to a chopping device 55 located between and at a height above the rear drive wheels 20. The chopping device 55 cuts the cane stalks into lengths called billets which are fed into a primary extractor 60 that operates to clean unwanted material such as leaves and other crop pieces from the billets by using a fan (not shown). The billets then pass into a receptacle 65 that accumulates the billets.

A compression thrower 70 is positioned to receive billets from the receptacle 65. The compression thrower 70 is configured to form a mat of sugarcane and propel the sugarcane to a target location 75. The target location 75 may be a wagon, cart, basket, or other object or location. The compression thrower 70 includes a first belt 80. The first belt 80 may receive billets from the receptacle 65.

A metering device 85 may be positioned adjacent the first belt 80. The metering device 85 may include any known device to control the flow of sugarcane (e.g., auger, gate, paddle wheel).

A compression device 90 is positioned against a second belt 95. The second belt 95 is positioned at an angle 97 relative to a vertical axis 135 and may operate at a higher or lower speed than the first belt 80. The compression device 90 is configured to compress sugarcane billets into the mat of sugarcane. In the embodiment shown, the compression device 90 is a pressure plate 100 cooperating with the second belt 95 to compress the sugarcane.

Referring to FIG. 2, in another embodiment, the compression device 90 may be a third belt 105 positioned at an angle 107 relative to the vertical axis 135. The third belt 105 may cooperate with the second belt 95 to compress and propel the sugarcane. The second belt 95 and the third belt 105 may operate at a higher or lower speed than the first belt 80.

A deflector 110 may be positioned adjacent the second belt 95. The deflector 110 may cooperate with the compression thrower 70 to direct the mat of sugarcane to the target location 75. An angle 112 of the deflector 110 relative to the vertical axis 135 may be changed by an actuator 115 coupled to the deflector 110 and the harvester 10 to adjust the direction of the mat of sugarcane to the target location 75.

Figure 3:
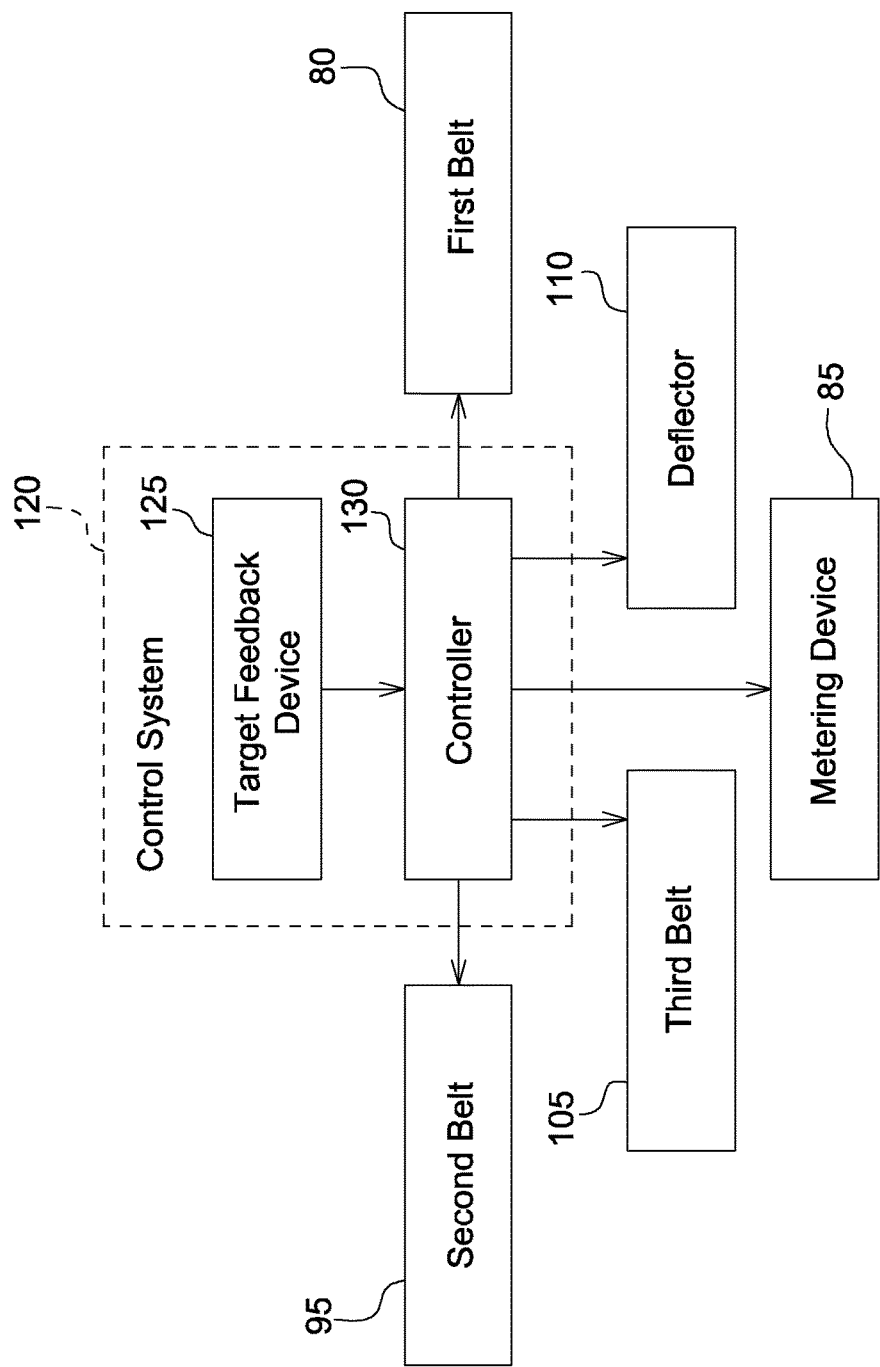
FIG. 3 is a schematic of a control system of a sugarcane harvester according to yet another embodiment.

Referring to FIG. 3, a control system 120 is provided on the harvester 10 to control the propulsion of the mat of sugarcane to the target location 75. The control system 120 includes a target feedback device 125 providing a target feedback signal. The target feedback signal is indicative of the position and velocity of the target location 95.

A controller 130 is in communication with the target feedback device 125 and is configured to automatically adjust at least one of the metering device 85 to control the flow of sugarcane, the speed of the first belt 80 via a motor (e.g., hydraulic, electronic), the angle 97 of the second belt 95 relative to the vertical axis 135 (FIG. 2) via an actuator (e.g., hydraulic, electronic), a speed of the second belt 95 via a motor (e.g., hydraulic, electronic), and the angle 112 of the deflector 110 relative to the vertical axis 135 via an actuator (e.g., hydraulic, electronic) to propel the mat of sugarcane to the target location 95. The controller 130 may also adjust at least one of an angle 107 of the third belt 105 relative to the vertical axis 135 and the speed of the third belt 105 to propel the mat of sugarcane to the target location 95.

Various features are set forth in the following claims.

What is claimed is:

1. A sugarcane harvester, comprising:
a basecutter configured to cut sugarcane;
a feeding device in communication with the basecutter to receive cut sugarcane;
a chopping device in communication with the feeding device, the chopping device configured to chop the sugarcane received from the feeding device;
a primary extractor in communication with the chopping device and configured to extract debris from the sugarcane;
a receptacle in communication with the primary extractor and configured to receive sugarcane; and
a compression thrower in communication with the receptacle, the compression thrower comprising:
a first belt configured to receive sugarcane from the receptacle; and
a compression device configured to compress sugarcane into a mat of sugarcane against a second belt adjacent the compression device, the second belt configured to propel the mat of sugarcane from the sugarcane harvester to a target location, a control system for controlling the propulsion of the mat of sugarcane to the target location, the control system comprising a target feedback device providing a target feedback signal indicative of the target location and velocity and a controller in communication with the target feedback device and configured to automatically adjust at least one of an angle and a speed of the second belt to propel the mat of sugarcane to the target location.

2. The sugarcane harvester of claim 1, wherein the compression device is a third belt cooperating with the second belt to compress and propel the sugarcane.

3. The sugarcane harvester of claim 2, wherein the second belt and the third belt operate at a higher speed than the first belt.

4. The sugarcane harvester of claim 2, wherein at least one of an angle of the second belt and the third belt relative to a vertical axis and a speed of the second belt and third belt is changed to propel the mat of sugarcane to the target location.

5. The sugarcane harvester of claim 1, wherein the second belt operates at a higher speed than the first belt.

6. The sugarcane harvester of claim 1, wherein the compression device is a pressure plate cooperating with the second belt to compress the sugarcane.

7. The sugarcane harvester of claim 1, further comprising a metering device adjacent the first belt, the metering device configured to control the flow of sugarcane.

8. A sugarcane harvester, comprising:
a basecutter configured to cut sugarcane;
a feeding device in communication with the basecutter to receive cut sugarcane;
a chopping device in communication with the feeding device, the chopping device configured to chop the sugarcane received from the feeding device;
a primary extractor in communication with the chopping device and configured to extract debris from the sugarcane;
a receptacle in communication with the primary extractor and configured to receive sugarcane; and
a compression thrower in communication with the receptacle, the compression thrower comprising:
a first belt configured to receive sugarcane from the receptacle; and
a compression device configured to compress sugarcane into a mat of sugarcane against a second belt adjacent the compression device, the second belt configured to propel the mat of sugarcane from the sugarcane harvester to a target location, wherein at least one of an angle of the second belt relative to the first belt and a speed of the second belt is changed to propel the mat of sugarcane to a target location.

9. A compression thrower for a sugarcane harvester having a receptacle for receiving sugarcane, the compression thrower comprising:
a first belt configured to receive sugarcane from the receptacle; and
a compression device configured to compress sugarcane into a mat of sugarcane against a second belt adjacent the compression device, the second belt configured to propel the mat of sugarcane from the sugarcane harvester to a target location, and
a control system for controlling the propulsion of the mat of sugarcane to the target location, the control system comprising a target feedback device providing a target feedback signal indicative of the target location and velocity and a controller in communication with the target feedback device and configured to automatically adjust at least one of an angle and a speed of the second belt to propel the mat of sugarcane to the target location.

10. The compression thrower of claim 9, further comprising a metering device adjacent the first belt, the metering device configured to control the flow of sugarcane.

11. The compression thrower of claim 9, wherein the compression device is a third belt cooperating with the second belt to compress and propel the sugarcane.

12. The compression thrower of claim 11, wherein the second belt and the third belt operate at a higher speed than the first belt.

13. The compression thrower of claim 9, wherein the second belt operates at a higher speed than the first belt.

14. The compression thrower of claim 9, wherein the compression device is a pressure plate cooperating with the second belt to compress the sugarcane.

15. A compression thrower for a sugarcane harvester having a receptacle for receiving sugarcane, the compression thrower comprising:
   a first belt configured to receive sugarcane from the receptacle; and
   a compression device configured to compress sugarcane into a mat of sugarcane against a second belt adjacent the compression device, the second belt configured to propel the mat of sugarcane from the sugarcane harvester to a target location, wherein the compression device is a third belt cooperating with the second belt to compress and propel the sugarcane, the second belt and the third belt operate at a higher speed than the first belt, and at least one of the angle of the second belt and the third belt relative to the first belt and the speed of the second belt and third belt is changed to propel the mat of sugarcane to the target location.

16. A compression thrower for a sugarcane harvester having a receptacle for receiving sugarcane, the compression thrower comprising:
   a first belt configured to receive sugarcane from the receptacle; and
   a compression device configured to compress sugarcane into a mat of sugarcane against a second belt adjacent the compression device, the second belt configured to propel the mat of sugarcane from the sugarcane harvester to a target location, wherein at least one of an angle of the second belt relative to the first belt and a speed of the second belt is changed to propel the mat of sugarcane to a target location.

17. A sugarcane harvester, comprising:
   a basecutter configured to cut sugarcane;
   a feeding device in communication with the basecutter to receive cut sugarcane;
   a chopping device in communication with the feeding device, the chopping device configured to chop the sugarcane received from the feeding device;
   a primary extractor in communication with the chopping device and configured to extract debris from the sugarcane;
   a receptacle in communication with the primary extractor and configured to receive sugarcane;
   a compression thrower in communication with the receptacle, the compression thrower comprising:
      a first belt configured to receive sugarcane from the receptacle;
      a compression device configured to compress sugarcane into a mat of sugarcane against a second belt adjacent the compression device, the second belt configured to propel the mat of sugarcane from the sugarcane harvester to a target location; and
      a metering device adjacent the first belt and the compression device and configured to control the flow of sugarcane from the first belt to the compression device.

18. A sugarcane harvester, comprising:
   a basecutter configured to cut sugarcane;
   a feeding device in communication with the basecutter to receive cut sugarcane;
   a chopping device in communication with the feeding device, the chopping device configured to chop the sugarcane received from the feeding device;
   a primary extractor in communication with the chopping device and configured to extract debris from the sugarcane;
   a receptacle in communication with the primary extractor and configured to receive sugarcane;
   a compression thrower in communication with the receptacle, the compression thrower comprising:
      a first belt configured to receive sugarcane from the receptacle;
      a compression device configured to compress sugarcane into a mat of sugarcane against a second belt adjacent the compression device, the second belt configured to propel the mat of sugarcane from the sugarcane harvester to a target location;
      a metering device adjacent the first belt and configured to control the flow of sugarcane; and
      a deflector adjacent the second belt configured to cooperate with the compression thrower to direct the mat of sugarcane to the target location; and
   a control system for controlling the propulsion of the mat of sugarcane to the target location, the control system comprising a target feedback device providing a target feedback signal indicative of the target location and velocity and a controller in communication with the target feedback device and configured to automatically adjust at least one of an angle and a speed of the second belt to propel the mat of sugarcane to the target location.

* * * * *